Sept. 9, 1952  B. G. FORMAN  2,609,716
WIRE INSULATION STRIPPER
Filed March 5, 1949

BENJAMIN G. FORMAN
INVENTOR

BY Joseph Blacker

ATTORNEY

Patented Sept. 9, 1952

2,609,716

UNITED STATES PATENT OFFICE 2,609,716

WIRE INSULATION STRIPPER

Benjamin G. Forman, Brooklyn, N. Y., assignor to Wilbe Research Corporation, Brooklyn, N. Y., a corporation of New York Application March 5, 1949, Serial No. 79,891

1 Claim. (Cl. 81—9.5)

This invention relates to an insulation wire stripper, and an object of this invention is to provide an improved tool for separating of duplex wire and for stripping insulation from single electric wires.

Another object of this invention is to provide an improved wire stripping tool comprising spring connected jaws provided with means for limiting the movement of the jaws to a predetermined cutting depth so that in operation the jaws will cut only through the insulation and without cutting the metal wire.

Another object of this invention is to provide an insulation stripping tool which has shear type cutting edges to separate duplex wire into single wires and shear type cutting edges for stripping the insulation of the single wires.

Another object of this invention is to bevel the jaws and to arrange the beveled surfaces on opposite sides of the jaws.

Another object of this invention is to provide each jaw with horizontal shearing surfaces for separating duplex wires and V-shaped shearing surfaces for shearing insulation and stripping the insulation from single wires.

Another object of this invention is to provide each jaw with two horizontal shearing edges so that the combined tool may also be used for shearing various materials.

With the above and other objects in view, the invention will be hereinafter more particularly described, and the combination and arrangement of parts will be shown in the accompanying drawings and pointed out in the claim which form part of this specification.

Reference will now be had to the drawings, wherein like numerals of reference designate corresponding parts throughout the several views, in which.

Figure 1:
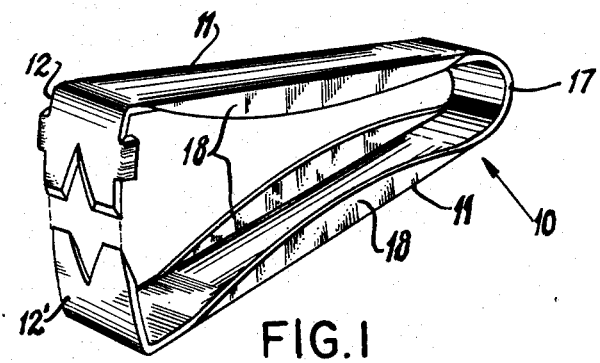
Figure 1 is a perspective view of an insulation separating and stripping tool made in accordance with this invention.
Figure 2:
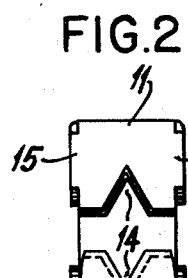
Figure 2 is an end elevation.

In the illustrated embodiment of the invention, the numeral 10 indicates a wire insulation shearing and stripping tool comprising a one-piece U-shaped spring metal handle terminating at its free end in a pair of manually grippable resilient arms 11.

Each arm 11 has a free end jaw portion directed toward the other arm. The jaws 12, 12' lie in parallel planes and in slidable contacting relation.

Each jaw terminates in horizontally bevelled edges 13 having V-shaped edges 14 centrally thereof. The edges 13 and 14 on the respective blades face in the same direction but are arranged on opposite sides of the jaws to face in opposite directions so as to coact in shearing relationship.

The jaw 12 has two inwardly bent extensions or lugs 15 forming a guideway 16 for the lower arm. The guideway 16 serves to align the V-shaped shearing surfaces during shearing operations.

Figure 3:
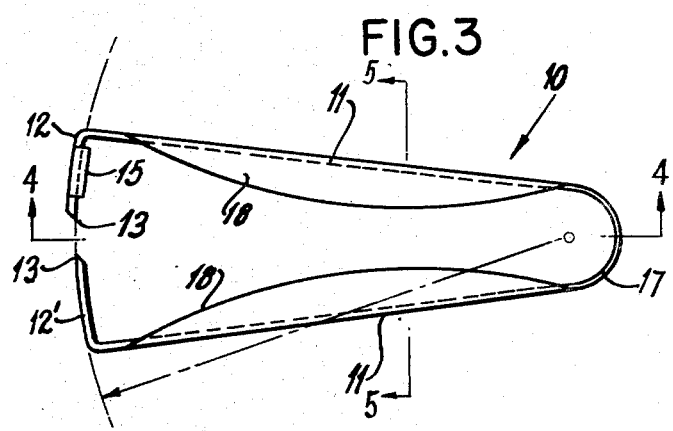
Figure 3 is a side view of the separating and stripping tool.
Figure 5:
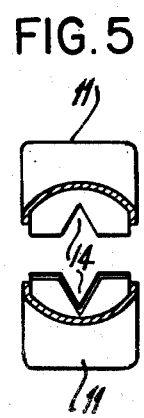
Figure 5 is a cross-sectional view on line 5—5 in Figure 3.
Figure 4:
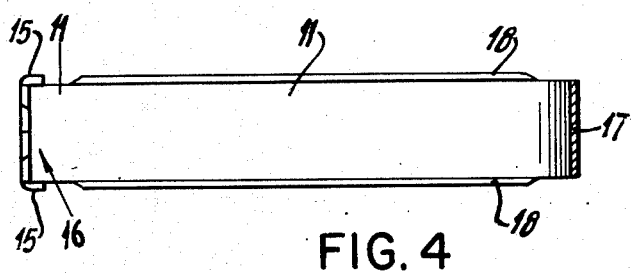
Figure 4 is a cross-sectional view taken on line 4—4 in Figure 3.

As shown by dot-and-dash lines in Figures 1 and 3, it will be clearly seen that the inner surface of the upper jaw comes in contact with the outer surface of the lower jaw during operating conditions. The jaws 12, 12' are of arcuate form. The jaws swing in parallel arcs having a center at the middle of a spring bow 17 which connects the arms 11. It is to be noted that by the above showing in the drawings, the jaws 12, 12' are formed of concentric parallel arcs. This arrangement causes the jaws to remain in shearing relationship during the entire swinging motion.

As best shown in Figure 1, each arm 11 has two arcuate lateral extensions 18 which come into abutment in point contact relation at their rear portions after the jaws 12, 12' are brought together in operative shearing relationship.

The abutment of the extensions 18 takes place when a small opening appears between the V-shaped upper and lower shearing edges 14.

The opening is small enough so that the edges 14 grip a bare wire after cutting the insulation but are prevented by the abutting relation of the extensions 18 from cutting the bare wire.

In accordance with the patent statutes I have described and illustrated the preferred embodiment of my invention, but it will be understood that various changes and modifications can be made therein without departing from the spirit of the invention as defined by the appended claim.

I claim:

In a tool for shearing apart duplex insulation wires and for shearing and stripping insulation from single insulation wires, a one-piece U-shaped spring comprising a pair of manually grippable and normally separated resilient arms, each of said arms having a free end jaw portion directed toward the other arm and which terminates in horizontally beveled shearing edges having V-shaped shearing edges centrally thereof, said beveled surfaces being arranged on opposite sides of said jaws to coact in shearing relationship, said jaws being of concentric arcuate form adapted to swing in parallel arcs, one of said jaws having extensions forming a guide-way for the other arm for alining said V-shaped shearing surfaces, internally abuttable arcuate lateral extensions at the rear portions of said arms to regulate the space between said shearing edges in closed position of said arms, said lateral arm extensions being in point contact relation when said jaws are in operative contacting relation, thereby permitting limited resilient movement of the shearing edges of said arms relative to each other to grip bare wires of different diameter during the stripping operation without cutting said bare wires.

BENJAMIN G. FORMAN.

REFERENCES CITED

The following references are of record in the file of this patent:

UNITED STATES PATENTS

| Number | Name | Date |
|---|---|---|
| 389,925 | Griscom | Sept. 25, 1888 |
| 520,818 | Bettinger | June 5, 1894 |
| 1,490,459 | Fergusson | Apr. 15, 1924 |
| 1,610,925 | Bryan | Dec. 14, 1926 |
| 1,685,977 | Bollerman | Oct. 2, 1928 |
| 2,079,672 | Allen et al. | May 11, 1937 |
| 2,376,135 | Frasher | May 15, 1945 |

FOREIGN PATENTS

| Number | Country | Date |
|---|---|---|
| 572,398 | Great Britain | Oct. 5, 1945 |